Figure 1:
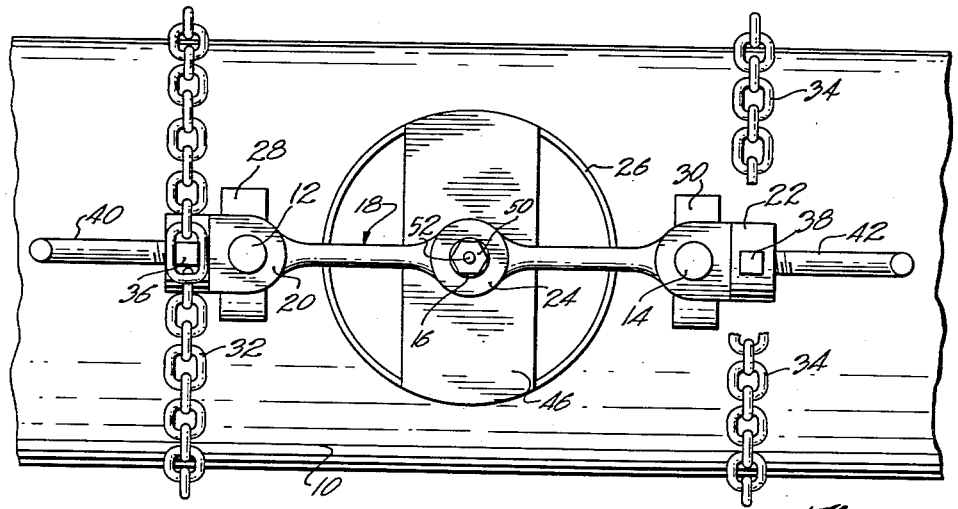

Dec. 13, 1960 C. P. BROOKS 2,963,928
APPARATUS FOR FORMING HOLES IN SEWER MAINS
Filed July 6, 1959

INVENTOR.
Charles P. Brooks
BY
Hovey, Schmidt, Johnson & Hovey
ATTORNEYS.

United States Patent Office 2,963,928
Patented Dec. 13, 1960

2,963,928
APPARATUS FOR FORMING HOLES IN SEWER MAINS

Charles P. Brooks, 6827 Floyd, Overland Park, Kans.

Filed July 6, 1959, Ser. No. 825,189
3 Claims. (Cl. 77—14)

This invention relates to apparatus for forming holes in sewer mains and has for its primary object the provision of a compact tool that may be used in small excavations or other locations where access to the pipe is relatively difficult.

The most important object of the present invention is the provision of a tool for the aforementioned purposes having means of attachment to the pipe that is quickly and easily attached and detached notwithstanding the fact that the pipe to be drilled is normally buried and, therefore, accessible only through an excavation.

A further object of the instant invention is to provide a drilling tool that may be operated by hand or through use of any one of a number of power devices that may be accessible on the job.

A still further object of the present invention is to provide apparatus for forming holes in sewer pipes that is capable of forming a smooth hole of proper dimensions without breaking or otherwise damaging the pipe.

Figure 2:
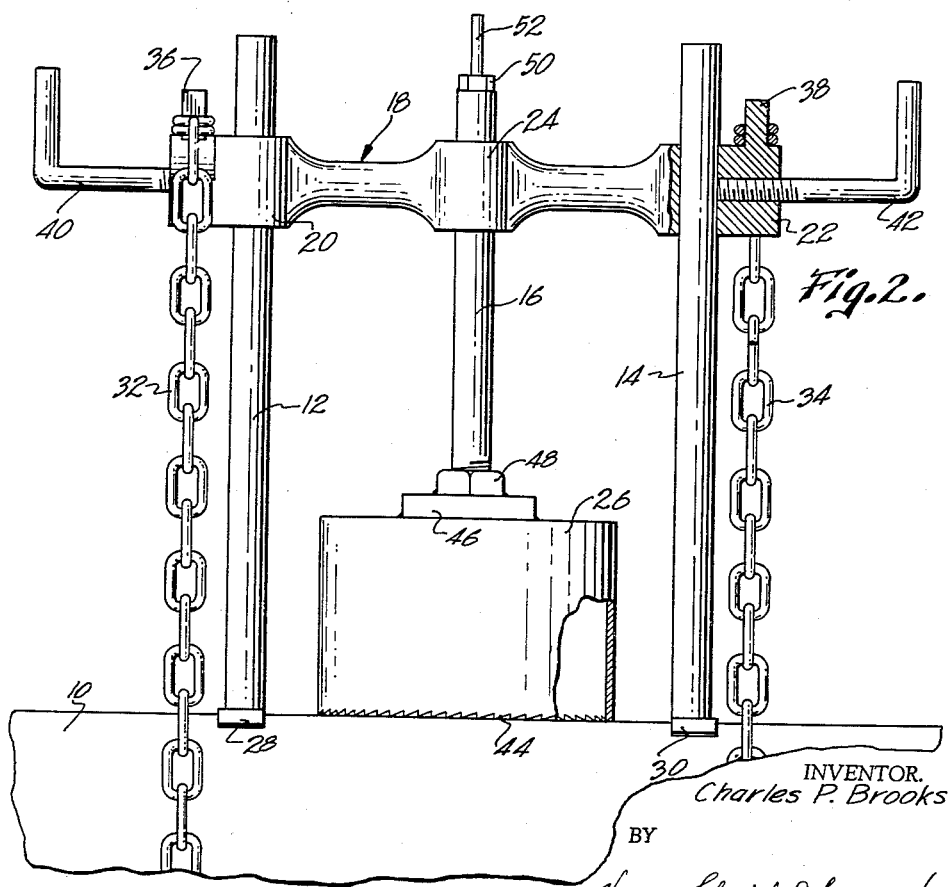

In the drawing:

Fig. 1 is a fragmentary view of a sewer pipe showing an end view of apparatus for forming holes therein made pursuant to the present invention; and Fig. 2 is a side elevational view of the apparatus in place on a pipe, parts being broken away for clearness.

Pipes made from ceramics or similar materials are difficult to drill, especially after the same have been laid. Nonetheless, it is oftentimes necessary to form an excavation to a sewer main for the purpose of attaching laterals thereto. In lieu of removing part of the main and placing T-joints therein, the connections can be more quickly and conveniently made if a hole is drilled in the sewer main. Accordingly, such pipe 10 is illustrated fragmentarily in the drawing and the apparatus forming the subject matter of the instant invention is shown operably mounted thereon.

Such apparatus includes a pair of spaced rods 12 and 14 extending radially outwardly from the pipe 10 and having a spindle 16 disposed therebetween and in parallelism therewith.

The rods 12 and 14 are interconnected by a crosshead 18 spanning the distance therebetween and having collars 20 and 22 slidable on the rods 12 and 14 respectively. A median bearing 24 forming an integral part of the crosshead 18, journals the spindle 16, it being understood that the latter is also reciprocable within the bearing 24 for movement of a cylindrical cutter 26 toward and away from the pipe 10.

Arcuate shoes 28 and 30 rigid to the rods 12 and 14 respectively, bear tightly against the pipe 10 when the apparatus is attached to the latter through use of a pair of chains 32 and 34. Chains 32 and 34 are in impaling relationship at their bights to the pipe 10 and are attached to the corresponding collars 20 and 22 by having their free end links looped over pins 36 and 38 integral with collars 20 and 22 respectively.

Any one of the two chains 32 or 34 may be looped over the pins 36 and 38, depending upon the desired distance of the crosshead 18 from the pipe 10. In any event, when the chains 32 and 34 are in place, the crosshead 18 may be grasped with one hand to pull the same outwardly and hold the chains 32 and 34 taut while set-bolts 40 and 42 are fastened in place, releasably locking the set collars 20 and 22 respectively to corresponding rods 12 and 14.

Cutter 26 is provided with a continuous row of cutter teeth 44 at one circular edge thereof, and with a crossbar 46 secured to its opposite circular edge. Bar 46 extends diametrically across the outer edge of cutter 26 and has the spindle 16 attached thereto. One means of attachment is shown as constituting a nut 48 welded to the bar 46 and receiving the external screw threads of the inner end of spindle 16.

The outermost end of the spindle 16 is provided with a head 50 having flats adapting the same for receiving a wrench or other tool used to rotate the spindle 16. Alternately, spindle 16 may be driven by an electric motor chucked directly to pin 52 rigid to the outer end of the spindle 16. In some instances, it may be necessary or desirable to interpose a flexible shaft between the pin 52 and the source of power.

Inasmuch as all component parts of the apparatus, except spindle 16 and cutter 26, are rigidly clamped to the pipe 10, the operator need be concerned only with the application of pressure as the cutter 26 rotates. If the spindle 16 is vertically disposed, the weight of cutter 26 may be sufficient to eliminate the necessity of additional pressure, but the slight amount of pressure needed can be applied by the operator handling the prime mover or flexible shaft connected to the pin 52.

The cutting action should slowly and gradually wear away the ceramic material from which the pipe 10 is made, forming a fine dust until such time as the hole is formed, all to the end that breakage of the pipe 10 is avoided and a smooth edge is produced for receiving a coupling used to attach the lateral to the sewer main 10.

Having thus described the invention what is claimed as new and desired to be secured by Letters Patent is:

1. Apparatus for forming holes in sewer mains comprising a pair of spaced, elongated rods, each having an arcuate, pipe-engaging shoe on one end thereof: a crosshead spanning the distance between the rods in perpendicular relationship thereto, said crosshead having a median bearing and a collar slidable on each rod respectively toward and away from the shoes; a pin on each collar respectively; a pipe-impaling chain for each collar respectively having the end links thereof looped over the pins, each collar having a set bolt for attaching the same to the corresponding rod, thereby holding the chains taut and the shoes against a sewer pipe with the rods extending radially outwardly from said pipe; a spindle journalled in the bearing between the rods in parallelism therewith; a cylindrical cutter between the rods having a crossbar secured thereto diametrically across one circular edge thereof and a continuous row of pipe-engaging cutter teeth at the opposite circular edge thereof; and means attaching one end of the spindle to the crossbar.

2. The invention of claim 1, wherein said spindle projects outwardly from said crosshead and is provided with a head having flats thereon for receiving a torque-producing tool.

3. The invention of claim 1, wherein said crosshead is freely slidable on said rods when said set bolts are disengaged from respective rods.

References Cited in the file of this patent
UNITED STATES PATENTS
197,235   Wells _____ Nov. 20, 1877